INVENTORS
RODNEY M. HUCK,
JOHN R. LeBLANC

United States Patent Office 3,756,980
Patented Sept. 4, 1973

3,756,980
HIGH TEMPERATURE STABLE MODIFIED
PHENOLIC MOLDING POWDERS
Rodney M. Huck, Longmeadow, and John R. Le Blanc,
Wilbraham, Mass., assignors to Monsanto Company,
St. Louis, Mo.
Filed Jan. 25, 1971, Ser. No. 109,107
Int. Cl. C08g 51/04
U.S. Cl. 260—38
19 Claims

ABSTRACT OF THE DISCLOSURE

Thermosettable molding powders of amine-modified novolac resin and aromatic polycarboxylic compound which have been processed with heat in a shear field to reduce the volatiles content to less than 2 weight percent. The product molding powder displays little or no tendency to blister, swell, or distort during molding and post-curing.

BACKGROUND

Thermosettable polymeric compositions incorporating an amine-modified novolac resin and an aromatic polycarboxylic compound have recently been developed; see, for example, the Le Blanc U.S. Pat. 3,558,559. These compositions have, when thermoset, excellent thermal stability characteristics, as exemplified, for example, by unusually high maximum continuous service temperatures for the thermoset compositions.

However, these new compositions have been found to display a certain amount of blistering, swelling, and distortion when formed into molded bodies, especially bodies which are, following molding, subjected to a post-curing operation. Such blistering, swelling, and distortion is caused by the evolution of volatiles from the thermosetting compositions. These volatiles comprise mainly water but also include minor amounts of unreacted starting materials (e.g. phenol and aniline). The high temperature exposure associated with molding and post-curing causes these volatiles to evolve with the visible effects noted.

Because of these generally undesirable visible effects associated with volatiles evolution, a considerable expenditure of time and effort has been expended in seeking to overcome or minimize volatiles evolution in molding powders of these new thermosettable polymeric compositions.

As those skilled in the art of conventional novolac based molding powders will readily appreciate, it has heretofore been the practice to mold ordinary novolac resins in the range of from about 300 to 360° F. Such resins characteristically cure rapidly (times of from about 2–5 minutes for a ¼ inch section being typical) so that a molded body has sufficient hardness and strength not to experience appreciable blistering, swelling and/or distortion during volatiles evolution therefrom. Although ordinary novolacs can be post-cured after molding to maximize heat resistance, the improvement in heat resistance achieved by post-curing such resins is characteristically only incremental so conventionally ordinary novolac based molding powders are not post-cured after a molding operation. Typically, ordinary novolac resin molding powders display maximum continuous service temperatures on the order of about 280–350° F. when molded (with or without post-curing).

In the case of the new molding powders of amine-modified novolac resin and aromatic polycarboxylic compound, however, it is necessary to mold in the range from about 450 to 650° F. which is far higher than is used with conventional novolac molding powders. Furthermore, even at these elevated temperatures, these new molding powders cure slowly so that times of from about 1 to 1½ hours at 500 to 600° F. for a ¼ inch section are required typically for curing (thermosetting). Because of the higher temperatures and longer curing times involved, the vapor pressure of the volatiles evolved during molding and post-curing of a molded body made with these new molding powders is such as to cause at times appreciable undesired changes in the body (e.g. blistering, swelling, distortion, etc.). The problem here is that the molded body has insufficient strength and hardness at the time these volatiles are evolved to prevent such changes. Usually, the greatest such changes in such a molded body occur in the post-curing operation and not in the molding operation. Hence, these new molding powders present a type of volatiles evolution problem not heretofore encountered in novolac molding powders.

Surprisingly and unexpectedly, there has now been discovered a technique for processing in a preliminary way such new Le Blanc type polymeric compositions so as to produce molding powders in which, when such so-processed molding powders are molded and/or post-cured, volatiles evolution is minimized or substantially eliminated without adversely affecting either molding powder moldability or the excellent high-heat performance characteristics associated with this class of thermosettable polymeric compositions when thermoset.

SUMMARY

This invention is directed to improved thermosettable molding powders which are adapted:

(A) To be molded into articles of manufacture using temperatures ranging from about 450 to 650° F. and pressures ranging from about 2,000 to 20,000 p.s.i. or even higher, (B) To have a minimized evolution of water vapor during molding and thermosetting, and (C) When so molded and thermoset to have a maximum continuous service temperature in the range of at least about 525 to 600° F. These molding powders are derived from dry, powdered starting compositions of an amine-modified novolac resin and an aromatic polycarboxylic compound by subjecting such a starting composition simultaneously to both;

(1) A shear field of from about 50 to 800 sec.$^{-1}$, and (2) A temperature of from about 320 to 500° F. for a time sufficient to reduce the amount of volatiles generated by subsequent heating at 600° F. to less than 1½ percent of the weight of the molding powder.

A starting composition can include from about 10 to 80 weight percent of filler.

Molded articles of manufacture are produced from such product thermosettable molding powders by subjecting such a product molding powder simultaneously to temperatures ranging from about 450 to 650° F. and pressures ranging from about 2,000 to 20,000 p.s.i. for a time of from about 10 to 200 minutes.

The resulting so molded body can be thereafter substantially completely thermoset by subjecting same to temperatures ranging from about 300 to 700° F. in a programmed sequence of increasing temperature increments of from about 25–50° F. each applied for 2 to 8 hours at each increment, said sequence being accomplished within a total time interval ranging from about 24 to 48 hours.

This invention is further directed to the processes for producing such products.

DRAWINGS

The present invention is better understood by reference to the attached drawings wherein.

Figure 1:
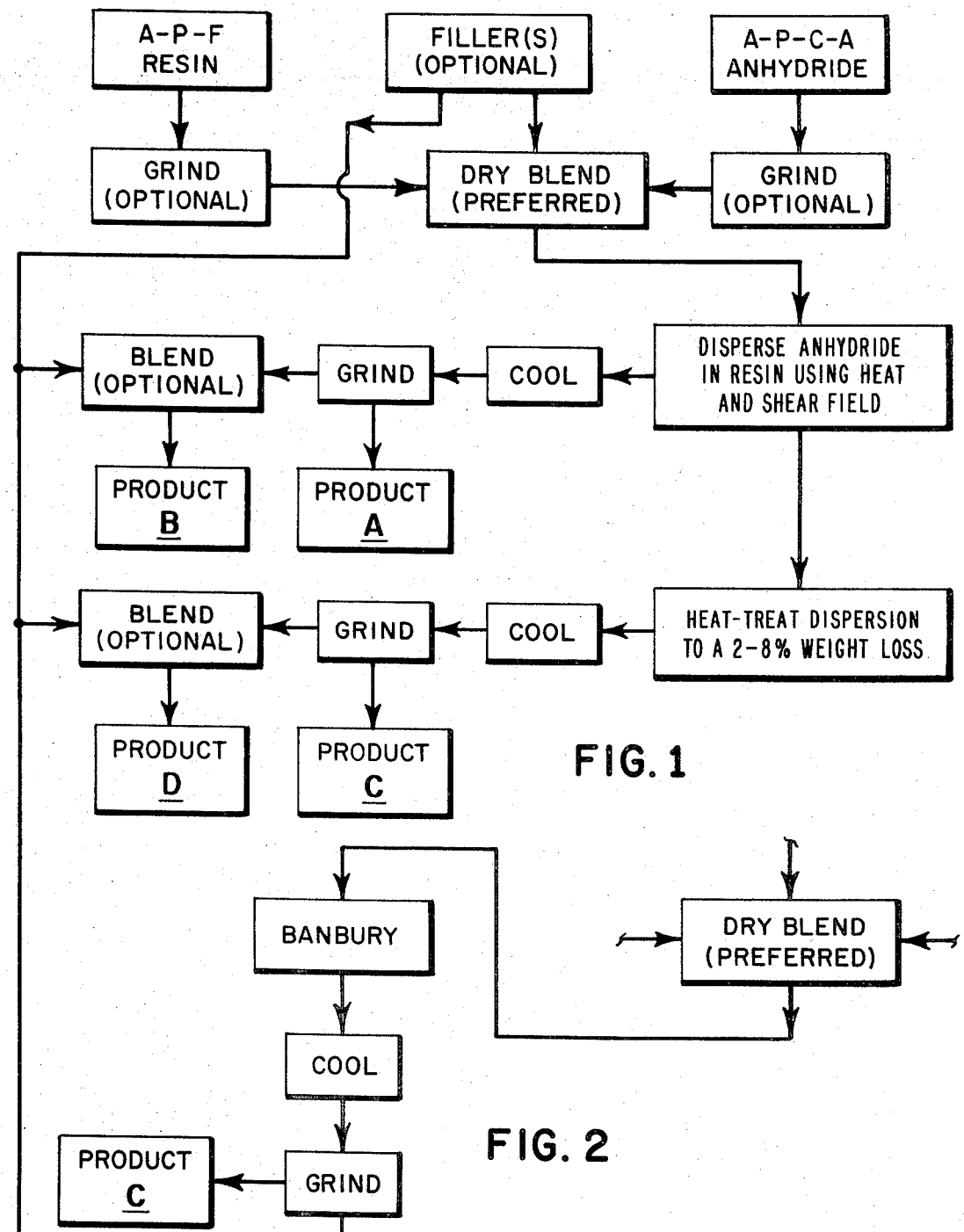
FIG. 1 is a flow sheet illustrating various manufacturing procedures for practicing the present invention.

Referring to FIG. 1, an amine-modified novolac resin (see box designated A-P-F Resin), an aromatic polycarboxylic compound (see box designated A-P-C-A Anhydride), and filler(s), which are optional but preferred ingredients in a starting composition (see box designated Filler(s) (Optional)), are blended together using heat and a shear field (see box labeled Disperse Anhydride in Resin Using Heat and Shear Field). As a preliminary, the amine-modified novolac resin, and/or the aromatic polycarboxylic compound, are ground, respectively, to some prechosen particle size (see boxes designated Grind (Optional)), and also the amine-modified novolac resin and the aromatic polycarboxylic compound are preferably preblended together with filler (if such is used) in a dry form (see box labeled Dry Blend (Preferred)) before the components are subjected to heat and shear. Because of the mixing action of the shear field, the components can be mixed during application of heat and shear. It is believed that during application of heat and shear field, the aromatic polycarboxylic compound becomes dispersed in the resin. Under relatively mild conditions of heat and shear, relatively little reaction takes place between carboxylic compound and resin while a maximum of mixing (dispersing of carboxylic compound in resin) takes place. Typical mild conditions of heat and shear involve temperatures ranging from about 300 to 200° F. and shear in the range from about 50 to 100 sec.$^{-1}$.

In the manufacturing sequence of FIG. 1, it is preferred to subject a starting mixture to such relatively mild heat/shear conditions before subjecting such to more vigorous conditions (see box labeled Heat Treat Dispersion to a 2-8% Weight Loss). Such relatively mild heat/shear conditions are conveniently provided by mill rolling, as, for example, by using a pair of differential rolls each about 5 inches in diameter where the front roll is heated to about 240° F. and the back roll is maintained at ambient temperatures (e.g. about 77° F.) with the rolls revolving at about 80 r.p.m. using a shear rate of about 75 to 100 sec.$^{-1}$.

The more vigorous conditions typically involve temperatures ranging from about 500 to 800° F. and shear in the range from about 80 to 800 sec.$^{-1}$. Such conditions are conveniently provided by a Banbury mixer. Preferably, such rates range from about 100-400 sec.$^{-1}$.

Observe that when using mill rolls, the heat/shear combination is, in effect, applied to a composition intermittently only when such composition is in the vicinity of, and passing through, the nip region between rolls. Residence time in this nip region is characteristically usually less than about 1 second. In contrast, observe that when using a Banbury, the heat/shear combination is, in effect, applied to a composition continuously, so that actual elapsed time spent by a composition under heat/shear tends to build up far more rapidly in a Banbury mixer than in a mill roll mixer.

To make a molding powder of this invention by a FIG. 1 sequence using only mild conditions of heat/shear, one subjects a starting composition to these conditions at least for a time sufficient to cause a weight loss (produced by violatiles evolution as vapor) of at least about ½% (based on total starting weight). Thereafter, even though the compositions of this invention are relatively slow to thermoset, it is convenient and preferred to cool a so-processed system to a temperature below about 75° F. so as to stop any appreciable thermosetting (see box labeled Cool). Next, this product is usually subjected to a grinding operation (see box labeled Grind) to reduce average particle sizes therein for convenience in forthcoming molding operations. Finally, this product is usually admixed (see box labeled Blend), if desired, with various additives, especially filler(s) to produce a molding powder ready for some particular end use application (see boxes labeled Product A and Product B).

To make a molding powder of this invention by a FIG. 1 sequence using vigorous heat/shear conditions, one can employ first mild conditions of heat/shear applied to a starting composition only for a time sufficient to disperse substantially completely aromatic polycarboxylic compound in amine-modified novolac resin. During this time, little or even substantially no volatiles evolution many occur from the starting composition, depending upon particular conditions employed for this mixing operation. Thereafter, one applies to the so-mixed composition the more vigorous conditions of heat/shear. For example, and preferably, this preliminary mixing operation may be accomplished using mill rolls, and thereafter the mixed composition is transferred to a Banbury mixer for more vigorous conditions of heat/shear where volatiles are evolved from such a composition to some desired extent (in the range from ½ to 8%, as indicated). The resulting mass is usually then cooled to a temperature below about 75° F. (so as to stop any thermosetting) and then the cooled product is usually subjected to a grinding operation to reduce average particle sizes therein for convenient use in forthcoming molding operations. Finally, the ground product is usually admixed with additives, particularly filler(s) to make a molding powder ready for end use. (See the boxes labeled, respectively, Cool, Grind, and Blend.) Preferred products of this invention are produced using vigorous heat/shear conditions (see boxes labeled Product C and Product D).

Figure 2:
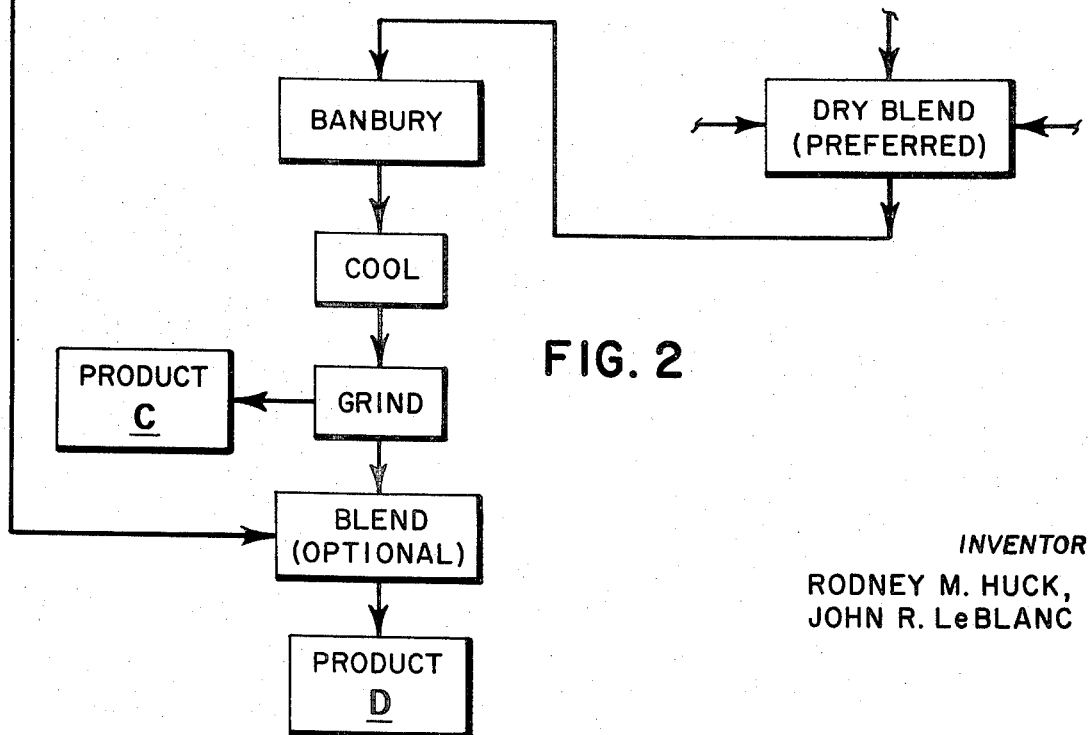
FIG. 2 is a flow sheet illustrating a preferred procedure for making certain preferred products of the present invention.

In FIG. 2 is shown a preferred technique for making products of the type designated as Product C and Product D in FIG. 1. Here, starting components are preferably first dry blended and then are fed directly to a Banbury mixer.

Afterwards, the so-processed product is cooled, ground, and blended as above indicated to produce Product C and Product D.

Products A, B, C, D are used by (1) molding (in which partial curing is effected), and, optionally (2) post-curing (in which substantially complete thermosetting is effected).

DETAILS

In general, any amine-modified novolac resin known to the prior art may be employed in the practice of this invention. One preferred class of amine-modified novolac resins for use in the present invention is characterized by having:

(A) An amine-modified novolac resin characterized by having:

(1) a number average molecular weight of from about 200 to 1000,
(2) at least two aryl moieties per molecule, the aryl nucleus of each aryl moiety containing from 6 through 10 carbon atoms each,
(3) at least one divalent bridging moiety of the formula:

(1) 

wherein $R_1$ and $R_2$ are each individually selected from the group consisting of hydrogen, lower alkyl, lower alkylene, lower halo-alkyl aryl of from 6 through 12 carbon atoms, haloaryl of 6 through 12 carbon atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moiety,
(4) at least one >NH group per molecule, one bond of which is directly attached to one of said aryl nuclei and the other bond of which is attached to another of said aryl nuclei or to a radical $R_1$ as defined above, (5) at least one —OH group per molecule each such group being directly attached to a different one of said two aryl nuclei,
(6) a percent oxygen acetyl of from about 3 to 26, and
(7) a percent nitrogen acetyl of from about 3 to 26.

In general, any aromatic polycarboxylic compound known to the prior art may be employed in the practice of this invention. One preferred class of such compounds for use in the present invention is characterized by the general formula:

(2)

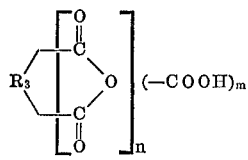

in which $R_3$ is an aromatic radical of three, four, five or six valences and containing from 6 to 24 carbon atoms; $n$ is an integer of from 0 through 3; $m$ is an integer of from 0 through 6; and the sum of $2n+m$ is always equal to the valences of $R_3$.

Preferably $R_1$ and $R_2$ are both hydrogen and, $R_3$ contains a single six membered aromatic ring (i.e. phenyl) or a benzophenone nucleus.

In any given starting composition, the relative proportions of said amine-modified resin and said aromatic polycarboxylic compound being such that said composition is thermosettable by heat; for example, at a temperature of at least about 400° F. without pressure.

In general, thermosetting of a starting or product thermosettable resin composition of this invention results from the reaction of an aromatic polycarboxylic compound with the reactable aromatic amine and the reactable aromatic hydroxyl group in an amine-modified novolac starting material. In a starting composition, sometimes as little as about 5 or 10 weight percent (or even less) of the stoichiometirc amount (that is, the amount of polycarboxylic compound) needed to completely react on a 1:1 mol basis each reactable aromatic amine group plus each reactable aromatic hydroxyl group with polycarboxylic compound is sufficient to effect thermosetting. On the other hand, sometimes as much as a 100 percent excess (or even more) of the stoichiometric amount as just described of polycarboxylic compound is desirable in a composition of the invention to produce thermosetting of a composition of this invention. Preferably from about 80 to 110 weight percent of such stoichiometric amount is employed.

For purposes of this invention, the term "thermoset" or "thermosetting" in reference to starting or product compositions of this invention indicates that a given thermosettable composition, after exposure to elevated temperatures for times sufficient to substantially completely react together substantially all of one of the two components (depending upon which one is present in excess of stoichiometric amount) with the other component comprising a composition of this invention yields a product which is not only substantially insoluble, but also is substantially infusible. For purposes of this invention, the term "substantially insoluble" in relation to "thermoset" or "thermosetting" has reference to insolubility (or extractability) in common organic solvents, such as methyl ethyl ketone, so that not more than about 10 weight percent of a given so thermoset product dissolves in such a solvent. Similarly, the term "substantially infusible" has reference to the fact that a given or thermoset product does not appreciably melt before decomposing when heated to elevated temperatures.

Because of the tendency for undesirable side reactions to occur (such as hydrolysis of the Formula 2 compounds), and because of the possibility that the thermosettable compositions of this invention will not uniformly crosslink in the presence of appreciable amounts of moisture, the starting compositions used in this invention are prepared using amine-modified novolacs and aromatic polycarboxylic compounds, respectively, in substantially anhydrous form. The term "substantially anhydrous" has reference to the fact that a given material contains initially less than about 5 weight percent free water (based on total weight) and preferably less than about 1 weight percent thereof and most preferably less than about ½ weight percent thereof.

For purposes of this invention, "oxygen acetyl percent" of an amine-modified novolac is conveniently determined by the method of Stroh and Liehr, J. Prakt. Chem. 29 (1–2), H. (1965).

Similarly, for purposes of this invention, "total acetyl percent" of an amine-modified novolac is conveniently determined by the method of Siggia. Nitrogen acetyl percent is obtained by difference.

In an amine-modified novolac, preferred phenols are phenol itself, alkylphenols, and aryl phenols wherein substituents on this phenol benzene ring have a total of from 1 to 8 carbon atoms, and, most preferably, from 1 to 6 carbon atoms.

Similarly, preferred amines are aromatic amines, and most preferably, are aniline, the alkyl-substituted anilines wherein the alkyl groups thereof have from 1 to 4 carbon atoms, and the alkyl-substituted diaminobenzenes wherein the alkyl groups thereof have from 1 to 4 carbon atoms. Similarly, formaldehyde is preferred as the aldehyde. In general, the teachings of Le Blanc in U.S. Pat. 3,558,559 are followed in preparing and selecting amine-modified novolacs for use in this invention.

In an aromatic polycarboxylic compound, there can be any combination of anhydride, or acid, as defined in Formula 2. A preferred number of carbonyl-containing groups per molecule is four, such as two anhydride groups, four acid groups, or a combination of any four of these carbonyl-containing groups. A particularly preferred aromatic carbonyl containing compound is benzophenone tetracarboxylic acid dianhydride (known as BTDA). In general, the teachings of Le Blanc in U.S. Pat. 3,558,559 are followed in preparing and selecting aromatic polycarboxylic compounds for use in this invention.

In general, a starting composition for use in this invention is in the form of a free-flowing powder. It is preferred to use an amine-modified novolac resin and an aromatic polycarboxylic compound in the form of respective solids which have particle sizes generally under about 100 mesh (U.S. Standard sieves). More preferably, particle sizes under about 170 mesh are used. The admixing of one component with the other can be made in a blender, such as a so-called Waring blender, a ball mill, mill roll, or the like, although any convenient mechanical mixing means may be employed.

Those skilled in the art will readily appreciate that various conventional additives can be composited with the starting compositions used in this invention to promote effectiveness for particular end uses. For example, one can add fillers, dyes, colorants, release agents, fungicides, coupling agents, and the like.

In the case of particulate solid diluent materials conventionally used in making molding compositions, one can admix with a starting composition of this invention from about 10 to 80 weight percent (based on total starting composition weight) of particulate inert diluent. In addition, a molding composition typically contains in addition from about 1 to 2 weight percent of a lubricant and from about 1 to 2 weight percent of a colorant, though relatively higher or lower percentages of these last indicated components may be present in a starting composition, as those skilled in the art will appreciate.

In practicing the present invention, one can employ any convenient apparatus which will apply to a starting composition the heat and shear conditions above indicated. For reasons of convenience, mill rolls and Banbury mixers are commonly employed. Mill rolls may be conveniently used when one is producing in a composition a volatiles loss of under about 2 weight percent (total starting composition basis). However, when larger amounts of volatiles are being eliminated, devices capable of greater shear rates (with heat) are employed, such as Banbury mixers.

EMBODIMENTS

The following examples are presented in illustration of this invention and are not intended as limitations thereof. Where "parts" are mentioned, parts by weight are intended unless otherwise indicated.

EXAMPLE 1

Preparation of thermosetting resin powder from amine-modified phenolic resin and an aromatic polycarboxylic compound 1,000 grams of resin from Example D, U.S. Pat. No. 3,558,559 and 920 grams of benzophenone tetracarboxylic acid dianhydride (BTDA) are ground together through a laboratory Raymond mill (hammer mill) until essentially all of the material passes U.S. sieve No. 140. The product is a tan colored resin powder. When a small amount is placed on a hot plate at about 400° F., this resin powder softens and then cures to a hard thermoset resin. When an atempt is made to mold this resin powder in a conventional, thermoset, compression mold under varying conditions (temperature 400 to 600° F., pressure 4,000–10,000 p.s.i., cure time 10 to 120 minutes), excess volatiles prevent the obtainment of a satisfactorily molded piece. Volatile content is determined by heating 3 grams in an air circulating oven at 600° F. for 10 minutes and calculating the percent weight loss. By this test, this resin powder shows approximately 8 percent volatiles.

EXAMPLES 2–7

Following the same general procedure described in Example 1, a series of resin powders are prepared from amine-modified phenolic resins and aromatic polycarboxylic compounds. Table I below describes each resin (including Example 1).

EXAMPLE 8

Preparation of unfilled molding powder from amine-modified phenolic resin and an aromatic polycarboxylic compound 500 grams of resin powder from Example 1 is processed on heated differential, 5 inch diameter mill rolls. The front roll (slower) is preheated to about 240° F., the back roll is left at essentially room temperature. A sheet is formed in about 2 minutes. It is cut from the rolls and re-passed 2–3 times before allowing to cool to room temperature. The sheet is broken up and ground through a laboratory Raymond mill until essentially all of the material passes U.S. sieve No. 140. The product is somewhat browner than that of Example 1. By the volatile test given in Example 1, this molding powder shows approximately 6½% volatiles so that this mill rolling has removed about 1½ weight percent total volatiles. When an attempt is made to mold this material in a conventional thermoset, compression mold under varying conditions (temperature 400–600° F., pressure 4,000 to 10,000 p.s.i., cure time 10 to 120 minutes), excess volatiles again prevent the obtainment of an imperfection-free molded body, although obvious improvement over Example 1 is noted. However, such molded body is suitable for many end use applications even so.

EXAMPLE 9

Preparation of unfilled molding powder from amine-modified phenolic resin and an aromatic polycarboxylic compound Part A.—Resin powder from Example 1 is processed in a laboratory Banbury (Farrel Midget Mixer) under the following conditions:

Charge weight—320–340 grams
Jacket temperature at start—320° F. (steam heated)
Rotor speed—95 r.p.m.
Ram air pressure—80 p.s.i.
Mixing time—2 minutes After about three-quarters of a minute of mixing, visible vapors are evolved (largely steam). The temperature of the charge is estimated to be about 350° F. at this point. The charge then becomes stiffer and is ground by the action of the rotors to a coarse powder before discharging. The temperature increases to about 460° F. before the end of the cycle. After cooling to room temperature, the coarse powder is ground through a laboratory Raymond mill until essentially all of the material passes U.S. sieve No. 140. It is then blended to insure uniformity. The product is darker brown than that of Example 8. By the volatile test given in Example 1, this unfilled molding powder shows approximately 1–1½ percent volatiles, so that about 6½ to 7 percent volatiles have thus been removed.

Part B.—A ¼ inch thick 5 inch x 5 inch molded block is prepared from this molding powder by charging about 165 grams to a compression mold preheated to about 500° F. Molding pressure equivalent to 5,000–6,000 p.s.i. is applied. After 1–2 minutes, the mold is gas released (breathed) 2 to 3 times. The mold is then heated under pressure over a period of about 60 minutes while increasing the temperature to about 600° F. After reaching 600° F., the mold is allowed to cool under pressure to about 400° F. (about 30 minutes) and the piece removed. The molding is dark brown in color with an excellent molded surface. It is rigid when hot, dimensionally stable without voids and is easily machined to any desired shape. A more complicated piece (threaded bottle cap) is easily molded under similar conditions except that the total cycle is reduced to about 30 minutes. This demonstrates that the molding powder has sufficient flow to mold at least relatively intricate parts of high quality.

Part C.—The above molded block is cut into ASTM physical test specimens. These pieces are post-cured by being heated in an air-circulating oven in accordance with the following schedule:

4 hours at 329° F.
4 hours at 428° F.
4 hours at 464° F.
4 hours at 500° F.
4 hours at 536° F.
2 hours at 554° F.

No blistering, swelling, cracking or distortion or other undesirable such effect occurs during this post-curing. Further, heat aging of specimens for test purposes is carried out at 550 and 600° F. in an air-circulating oven. Physical

TABLE I

| Ex. | 1 | 2 | 3 | 4 | 5 | 6 | 7 |
|---|---|---|---|---|---|---|---|
| Part A (resin type) (Ex. in U.S. Pat. 3,558,559). | D | D | A | G | E | N | T |
| Part B (aromatic polycarboxylic compound). | BTDA | BTDA | BTDA | TMA | BTDA, TMA | PMDA | TMA |
| Ratio by weight of A to B | 1/0.92 | 1/0.75 | 1/0.77 | 1/0.86 | 1/0.69, 1/0.30 | 1/0.63 | 1/0.48 |

BTDA, benzophenone tetracarboxylic acid dianhydride; TMA, trimellitic anhydride; PMDA, pyromellitic dianhydride.

properties of this unfilled material are shown in Table II below:

TABLE II

| Property | ASTM Test No. | Value |
|---|---|---|
| Flexural strength | D-790 | |
| Tested at 75° F | | 14,000 p.s.i. |
| Aged 1,000 hrs. at 550° F | | 12,200 p.s.i. |
| Aged 200 hrs. at 650° F | | 8,800 p.s.i. |
| Tested at 550° F. (as is) | | 5,500 p.s.i. |
| Tested at 550° F. (aged 1,000 hrs. at 550° F.). | | 7,500 p.s.i. |
| Flexural modulus; tested at 75) F. | D-790 | $6.3 \times 10^5$ p.s.i. |
| Comprehensive strength, tested at 75° F. | D-695 | 24,000 p.s.i. |
| Izod impact, notched; tested at 75) F. | D-256 | 0.26 ft. lbs./in. notch. |
| Rockwell hardness (E-scale); tested at 75) F. | D-785 | 125. |
| Specific gravity | D-792 | 1.31 |
| Heat distortiong | D-648 | 600°F. |
| Water absorption (24 hrs.) | D-570 | 0.5%. |
| Burning rate | D-635 | Non-burning. |
| Coefficient of friction | D-1894 | 0.21-0.28. |
| Thermal coefficient of expansion | D-696 | $2.6 \times 10^{-5}$ in./in./° F. |
| Dimensional change; after 100 hrs. at 600° F. | | 0.004 in./in. |

Electrical properties of this unfilled material are shown in Table III below:

TABLE III

| Property | ASTM Test No. | Value |
|---|---|---|
| Dielectric strength | D-149 | 380 v./mil (short time). |
| Dielectric constant | D-150 | $3.4$ ($10^5$ $H_2$) |
| Dissipation factor | D-150 | $0.006$ ($10^5$ $H_2$). |
| Insulation resistance | D-257 | $1.5 \times 10^{13}$ ohms. |
| As is (96/35/90) | | $1.3 \times 10^{13}$ ohms. |
| Volume resistivity | D-257 | $2.9 \times 10^{16}$ ohm-cm. |
| Surface resistivity | D-257 | $2.8 \times 10^{15}$ ohms. |
| Arc resistance | D-495 | 168 sec. |

A qualitative evaluation of chemical and solvent resistance, based on four weeks' exposure at room temperature is shown in Table IV below:

TABLE IV

| Chemical: | Rating |
|---|---|
| Skydrol hydraulic fluid | Excellent. |
| Dimethyl acetamide | Do. |
| Benzene | Do. |
| JP-4 jet fuel | Do. |
| 25% $H_2SO_4$ | Do. |
| Acetone | Do. |
| 10% NaOH | Slight dulling. |

EXAMPLE 10

Preparation of filled molding powder from amine-modified phenolic resin and an aromatic polycarboxylic compound Part A.—850 grams of resin powder from Example 1 and 150 grams of graphite powder (Asbury #280H) are preblended. This powder is then processed in laboratory Banbury (Farrel Midget Mixer) under the following conditions:

Charge weight—340-360 grams
Jacket temperature at start—320° F (steam heated)
Rotor speed—95 r.p.m.
Ram air pressure—80 p.s.i.
Mixing time—2 minutes After about three-quarters of a minute of mixing, visible vapors are evolved (largely steam). The temperature of the charge is estimated to be about 350° F. at this point. The charge then becomes stiffer and is ground by the action of the rotors to a coarse powder before discharging. The temperature increases to about 460° F. before the end of the cycle. After cooling to room temperature, the coarse powder is ground through a laboratory Raymond mill until essentially all of the material passes U.S. sieve No. 140. It is then blended to insure uniformity. The product is a black powder. By the volatile test given in Example 1, this filled molding powder shows approximately 1–1½ percent volatiles, so that about 6½ percent volatiles have thus been removed.

Part B.—A ¼ inch thick 5 inch x 5 inch molded block is prepared from this molding powder by charging about 175 grams to a compression mold preheated to about 500° F. Molding pressure equivalent to 5,000–6,000 p.s.i. is applied. After 1–2 minutes, the mold is gas released (breathed) 2 to 3 times. The mold is then heated under pressure over a period of about 60 minutes while increasing the temperature to about 600° F. After reaching 600° F., the mold is allowed to cool under pressure to about 400° F. (about 30 minutes) and the piece removed. The molding is black with an excellent molded surface. It is rigid when hot, dimensionally stable without voids and is easily machined to any desired shape.

Part C.—The above molded block is cut into ASTM physical test specimens. These pieces are post-cured by being heated in an air-circulating oven in accordance with the following schedule:

4 hours at 329° F.
4 hours at 428° F.
4 hours at 464° F.
4 hours at 500° F.
4 hours at 536° F.
2 hours at 554° F.

No blistering, swelling, or cracking occurs during post-curing. Further heat aging of specimens for test purposes is carried out at 550 and 600° F. in air circulating oven. Physical properties of this filled material are shown in Table V below:

TABLE V

| Property | ASTM Test No. | Value |
|---|---|---|
| Flexural strength | D-790 | 12,600 p.s.i. |
| Tested at 75° F | | 12,600 p.s.i. |
| Aged 800 hrs. at 600° F | | 11,890 p.s.i. |
| Flexural modulus | D-790 | |
| Tested at 75° F | | $6.5 \times 10^5$ p.s.i. |
| Aged 800 hours at 600° F | | $6.4 \times 10^5$ p.s.i. |
| Dimensional change after 1,000 hrs. at 600° F. | | 0.005 in./in. |
| Specific gravity | D-792 | 1.50. |
| Rockwell hardness (E-scale); tested at 75° F. | D-785 | 90. |
| Thermal coefficient of expansion (73–500° F.). | duPont | $1.5-3.5 \times 10^{-5}$ in./in. ° F. |

EXAMPLE 11

Preparation of filled brake lining molding mix from amine-modified phenolic resin and an aromatic polycarboxylic compound Part A.—250 grams of resin powder from Example 1, 500 grams of asbestos fiber (Johns-Manville No 6D24) and 250 grams of barytes are dry mixed in a laboratory Henschel mixer. Mix is then dried for one hour at 176–185° F. in an air-circulating oven.

Part B.—A ⅜ inch thick 5 inch x 5 inch molded block is prepared from this mix by first making a preform to fit this mold (about 380 grams). Preform is dielectrically preheated and charged to a compression mold preheated to about 500° F. Molding pressure equivalent to 8,000–10,000 p.s.i. is applied. After 1–2 minutes, the mold is gas released (breathed) 5 to 6 times. The mold is then heated under pressure over a period of about 90 minutes at 500° F. It is then allowed to cool under pressure to about 400° F. (about 30 minutes) and the piece removed. The molding is gray-brown in color with a good molded surface. It is rigid when hot, dimensionally stable without voids and of high density.

Part C.—The above molded block is cut into test specimens approximately 7/16 inch x 2 inches x 3 inches. All surfaces are sanded. These pieces are post-cured by being heated in an air-circulating oven in accordance with the following schedule:

4 hours at 356° F.
4 hours at 410° F.
4 hours at 464° F.
4 hours at 518° F.
4 hours at 572° F.
4 hours at 600° F.

No blistering, swelling, cracking, or other undesirable side effect occurs during this post-curing. Dimensions, weight and surface hardness are determined initially and after exposure to the following schedule of heating in an air-circulating oven.

1 hour at 600° F.
1 hour at 700° F.
1 hour at 800° F.
½ hour at 900° F.

Values obtained are shown in Table VI below:

TABLE VI

| Property [1] | Initial | 1 hour at ° F.— | | | ½ hour at 900° F. |
|---|---|---|---|---|---|
| | | 600 | 700 | 800 | |
| Shrinkage (in./in.) | | Nil | 0.0004 | 0.0015 | 0.0018 |
| Weight loss (percent) | | 0.10 | 0.60 | 3.6 | 5.5 |
| Rockwell hardness (E-scale) | 110 | 114 | 100 | 94 | 78 |

[1] Same specimens used for all temperatures. Shrinkage based on width and length.

By the term "filler" conventional reference is had to particulate bodies which are preferably inert (as respects the resins used in this invention) and which are preferably not thermoplastic. Also, fillers used in this invention, of course, are stable over the temperatures used in processing the resins involved (including application). Thus, typical fillers include glass bodies, especially short fibers, graphite powder, molybdenum disulfide powder, powdered metals (such as copper, bronze, aluminum, and the like), polytetrafluoroethylene powder, powdered minerals, including aluminiferous, calciferous, titaniferous, siliceous, etc. bodies (e.g. wollastonite, quartz, cryolite, barytes, silicon carbide, aluminum oxide, etc.) and the like. The boron, carbon (graphite), metallic etc. filaments and whiskers can be used.

What is claimed is:

1. A thermosettable molding powder comprising an intimate mixture of:
   (A) an aromatic amine-modified novolac characterized by having:
   (1) a number average molecular weight of from about 200 to 1000,
   (2) at least two aryl moieties per molecule, the aryl nucleus of each aryl moiety containing from 6 through 10 carbon atoms each,
   (3) at least one divalent bridging moiety of the formula:

wherein $R_1$ and $R_2$ are each individually selected from the group consisting of hydrogen, lower alkyl, lower alkylene, lower haloalkyl aryl of from 6 through 12 carobn atoms, and haloaryl of 6 through 12 carbon atoms, said bridging moiety having the unsatisfied valences of its carbon atom each bonded to a different one of said aryl moieties,
   (4) at least one >NH group per molecule, one bond which is directly attached to one of said aryl nuclei and the other bond of which is attached to another of said aryl nuclei or to a radical $R_1$ as defined above,
   (5) at least one OH group per molecule each such group being directly attached to a different one of said two aryl nuclei,
   (6) a percent oxygen acetyl of from about 3 to 26, and
   (7) a percent nitrogen acetyl of from about 3 to 26; and
   (B) an aromatic polcarboxylic compound, characterized by the general formula:

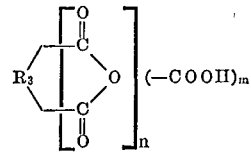

in which $R_3$ is an aromatic radical of three, four, five, or six valences and containing from 6 to 24 carbon atoms; $n$ is an integer of from 0 through 3; $m$ is an integer of from 0 through 6; and the sum of $2n+m$ is equal to the valence of $R_3$;
   wherein the proportion of aromatic polycarboxylic compound is between 5 and 200 percent of the stoichiometric amount of the aromatic amine-modified novolac; wherein the starting mixture has been subjected simultaneously to a shear field of from 80 to 800 sec.$^{-1}$ and a temperature of from 320 to 500° F. for a time sufficient to reduce the residual volatile content to less than 1.5 weight percent, prior to being cooled and ground.

2. A molding powder as in claim 1 wherein said aromatic polycarboxylic compound is selected from the group consisting of trimellitic anhydride, pyromellitic dianhydride and benzophenone tetracarboxylic acid dianhydride.

3. A molding powder as in claim 1 wherein said aromatic amine-modified novolac resin comprises a condensate of phenol, formaldehyde and an aromatic amine selected from the group consisting of aniline, alkyl substituted anilines wherein the alkyl group contains 1 to 4 carbon atoms and alkyl substituted diaminobenzenes wherein the alkyl group contains 1 to 4 carbon atoms, with a mol ratio of aromatic amine to phenol in the range from 50:50 to 70:30 and a mol ratio of formaldehyde to aromatic amine plus phenol in the range from 0.5 to 0.99.

4. A moulding powder as in claim 1 wherein the proportion of aromatic polycarboxylic compound is between 80 and 110 percent of the stoichiometric amount of the aromatic amine-modified novolac.

5. A molding powder as in claim 1 comprising particles which pass through a No. 140 U.S. sieve.

6. An article of manufacture molded from the molding powder of claim 1.

7. An article of manufacture molded from the molding powder of claim 1 at temperatures ranging from 450 to 650° F. and pressures ranging from 2000 to 20,000 p.s.i. for times ranging from 10 to 200 minutes.

8. An article of manufacture molded from the molding powder of claim 1 post-cured by heat treatment at temperatures ranging from 300 to 700° F.

9. An article of manufacture molded from the molding powder of claim 1 post-cured by heat treatment at temperatures ranging from 300 to 700° F. in a programmed sequence of increasing temperature increments.

10. A thermosettable molding powder comprising an intimate mixture of:
   (A) an aromatic amine-modified novolac resin consisting essentially of a condensate of aniline phenol and formaldehyde wherein the mol ratio of aniline to phenol is in the range from 50:50 to 70:30 and the mol ratio of formaldehyde to aniline plus phenol is in the range from 0.5 to 0.99; and
   (B) an aromatic polycarboxylic compound selected from the group consisting of trimellitic anhydride, pyromellitic anhydride and benzophenone tetracarboxylic acid dianhydride,
   wherein the relative proportions of aromatic amine-modified novolac resin and aromatic polycarboxylic compound are such that the mixture is thermosettable; and wherein the mixture has been subjected to a shear field of from 100 to 400 sec.$^{-1}$ and a temperature of from 320 to 500° F. and has then been cooled and ground.

11. An article of manufacture molded from the molding powder of claim 10.

12. An article of manufacture molded from the molding powder of claim 10 at temperatures ranging from 450 to 650° F. and pressures ranging from 2000 to 200,000 p.s.i. for times ranging from 10 to 200 minutes.

13. A process for making a thermosettable molding powder comprising the steps of:
(A) grinding and blending a composition comprising:
  (1) an aromatic amine-modified novolac resin characterized by having:
    (a) a number average molecular weight of from about 200 to 1000,
    (b) at least two aryl moieties per molecule, the aryl nucleus of each aryl moiety containing from 6 through 10 carbon atoms each,
    (c) at least one divalent bridging moiety of the formula:

$$-\underset{R_2}{\overset{R_1}{\underset{|}{\overset{|}{C}}}}-$$

wherein $R_1$ and $R_2$ are each individually selected from the group consisting of hydrogen, lower alkyl, lower alkylene, lower haloalkyl aryl of from 6 through 12 carbon atoms, and haloaryl of 6 through 12 carbon atoms, said bridging moiety having the unsatisfied valences of its carbon atoms each bonded to a different one of said aryl moieties,
    (d) at least one >NH group per molecule, one bond of which is directly attached to one of said aryl nuclei and the other bond of which is attached to another of said aryl nuclei or to a radical $R_1$ as defined above,
    (e) at least one OH group per molecule each such group being directly attached to a different one of said two aryl nuclei,
    (f) a percent oxygen acetyl of from about 3 to 26, and
    (g) a percent nitrogen acetyl of from about 3 to 26; and
  (2) an aromatic polycarboxylic compound characterized by the general formula:

$$\left[ R_3 \underset{\underset{O}{\overset{\|}{C}}}{\overset{\overset{O}{\overset{\|}{C}}}{\diagdown}} O \right]_n (-COOH)_m$$

in which $R_3$ is an aromatic radical of three, four, five, or six valences and containing from 6 to 24 carbon atoms; $n$ is an integer of from 0 through 3; $m$ is an integer of from 0 through 6; and the sum of $2n+m$ is equal to the valence of $R_3$;
the relative proportions of aromatic amine-modified novolac resin and aromatic polycarboxylic compound being such that the blend is thermosettable;

(B) subjecting the blend simultaneously to a shear field between 80 and 800 sec.$^{-1}$ and a temperature in the range of 320 to 500° F.; and
(C) cooling and grinding the resulting composition.

14. A process for making a thermosettable molding powder comprising the steps of:
(A) grinding and blending a composition comprising:
  (1) an aromatic amine-modified novolac resin consisting essentially of a condensate of aniline phenol and formaldehyde wherein the mol ratio of aniline to phenol is in the range from 50:50 to 70:30 and the mol ratio of formaldehyde to aniline plus phenol is in the range from 0.5 to 0.99; and
  (2) an aromatic polycarboxylic compound selected from the group consisting of trimellitic anhydride, pyromellitic anhydride and benzophenone tetracarboxylic acid dianhydride,
the relative proportions of aromatic amine-modified novolac resin and aromatic polycarboxylic compound being such that the blend is thermosettable;
(B) subjecting the blend simultaneously to a shear field between 50 and 800 sec.$^{-1}$ and a temperature in the range of 320 to 500° F; and
(C) cooling and grinding the resulting composition.

15. A process according to claim 14 wherein the amount of aromatic polycarboxylic compound is between 5 and 200 percent of the stoichiometric amount of aromatic amine-modified novolac resin.

16. A process according to claim 14 wherein the shear field is generated by a Banbury mixer.

17. A process according to claim 14 wherein the molding powder is ground in the final step to pass through a No. 140 U.S. sieve.

18. A molding powder of claim 1 having uniformly blended therewith from about 10 to 80 weight percent filler.

19. A molding powder as in claim 18 wherein the filler is selected from the group consisting of glass bodies, graphite powder, molybdenum disulfide powder, powdered copper, powdered bronze, powdered aluminum, calciferous mineral powders, titaniferous mineral powders, siliceous mineral powders, boron filaments, boron whiskers, and polytetrafluoroethylene powder, and wherein the residual volatile content of the molding powder is less than 1.5 percent.

References Cited
UNITED STATES PATENTS

| | | | |
|---|---|---|---|
| 3,391,103 | 7/1968 | Mueller | 260—38 |
| 3,558,559 | 1/1971 | Le Blanc | 260—51.5 |
| 3,389,117 | 6/1968 | Kozdemba et al. | 260—38 |

OTHER REFERENCES

Plastics Engineering Handbook (3rd edition) of the Society of Plastics Industry, Inc. Reinhold, New York (1960), pp. 73–80.

MORRIS LIEBMAN, Primary Examiner
S. M. PERSON, Assistant Examiner

U.S. Cl. X.R.
260—51.5